United States Patent
Okur et al.

(10) Patent No.: US 9,519,003 B1
(45) Date of Patent: Dec. 13, 2016

(54) MEASURING LAUNCH AND MOTION PARAMETERS

(71) Applicant: Rapsodo Pte. Ltd., Singapore (SG)

(72) Inventors: Batuhan Okur, Singapore (SG); Lodiya Radhakrishnan Vijayanand, Singapore (SG); Kelvin Yeo Soon Keat, Singapore (SG); Nyan Myo Naing, Singapore (SG)

(73) Assignee: RAPSODO PTE. LTD., Singapore (SG)

( * ) Notice: Subject to any disclaimer, the term of this patent is extended or adjusted under 35 U.S.C. 154(b) by 275 days.

(21) Appl. No.: 13/688,974

(22) Filed: Nov. 29, 2012

Related U.S. Application Data (60) Provisional application No. 61/564,585, filed on Nov. 29, 2011.

(51) Int. Cl.
| | | |
|---|---|---|
| *G01P 3/38* | (2006.01) | |
| *G01P 3/68* | (2006.01) | |
| *G01S 7/48* | (2006.01) | |
| *G01S 7/481* | (2006.01) | |

(52) U.S. Cl.
CPC . *G01P 3/38* (2013.01); *G01P 3/68* (2013.01); *G01S 7/4808* (2013.01); *G01S 7/4815* (2013.01)

(58) Field of Classification Search
CPC .......... G01P 3/38; G01P 3/68; G01S 7/4808; G01S 7/4815
See application file for complete search history.

(56) References Cited

U.S. PATENT DOCUMENTS

| | | | |
|---|---|---|---|
| 4,136,387 A | 1/1979 | Sullivan et al. | |
| 4,146,230 A | 3/1979 | Foster | |
| 4,542,906 A | 9/1985 | Takase et al. | |
| 5,437,457 A | 8/1995 | Curchod | |
| 5,472,205 A | 12/1995 | Bouton | |
| 5,479,008 A | 12/1995 | Nishiyama et al. | |
| 5,926,780 A | 7/1999 | Fox et al. | |
| 5,988,645 A * | 11/1999 | Downing .................. | F41J 5/02 250/222.2 |
| 6,088,106 A * | 7/2000 | Rockseisen .................. | 356/623 |

(Continued)

FOREIGN PATENT DOCUMENTS

| | | |
|---|---|---|
| GB | 2478059 A | 8/2011 |
| JP | H02-123927 U | 10/1990 |

(Continued)

OTHER PUBLICATIONS

International Search Report dated Apr. 28, 2014 as received in Application No. PCT/IB2013/002358.

(Continued)

*Primary Examiner* — Thai Tran
*Assistant Examiner* — Christopher T Braniff
(74) *Attorney, Agent, or Firm* — Maschoff Brennan (57) ABSTRACT

The technologies described herein relate to measuring launch parameters of a flying object, such as a golf ball or a baseball. The laser based technology enables a system that is low cost which can measure launch parameters of a ball. The launch parameters are measured and rapid feedback is provided on each ball motion event and the data of every single ball launch data is stored in the backend server. The system may include a transmitter optical subassembly (TOSA), a receiver optical subassembly (ROSA), a primary processing unit, a camera subsystem, a data processing, a feedback display unit, and a backend server.

17 Claims, 9 Drawing Sheets

(56) References Cited

U.S. PATENT DOCUMENTS

| | | | |
|---|---|---|---|
| 6,757,698 B2* | 6/2004 | McBride | G06F 11/1464 |
| 7,038,764 B2* | 5/2006 | Lee | A63B 24/0021 |
| | | | 273/333 |
| 2001/0023209 A1 | 9/2001 | Yamamoto | |
| 2004/0032970 A1 | 2/2004 | Kiraly | |
| 2005/0064948 A1 | 3/2005 | Bissonnette | |
| 2008/0204704 A1* | 8/2008 | Rankin | A63B 24/0021 |
| | | | 356/28 |
| 2009/0326742 A1* | 12/2009 | Varon | 701/4 |
| 2010/0225913 A1* | 9/2010 | Trainer | G01N 15/0205 |
| | | | 356/338 |

FOREIGN PATENT DOCUMENTS

| | | |
|---|---|---|
| JP | H06-98959 A | 4/1994 |
| JP | H11-257954 A | 9/1999 |
| JP | 2011-156353 A | 8/2011 |

OTHER PUBLICATIONS

Written Opinion of the International Searching Authority dated Apr. 28, 2014 as received in Application No. PCT/IB2013/002358.

Trackman—Golf Radar Solution. Retrieved on Nov. 28, 2012. <http://www.trackman.dk>.

Zelocity—Sports Performance Monitors. Retrieved on Nov. 28, 2012. <http://www.zelocity.com/>.

FlightScope—Launch Monitor, Golf Ball Tracking | Golf Simulators | Flightscope.com. Retrieved on Nov. 28, 2012. <http://www.flightscope.com/>.

Bailey, Randolph. "Physics of the Drive in Golf." Physics 211 Web Projects Fall 2002. Nov. 25, 2002. University of Alaska Fairbanks. <http://ffden-2.phys.uaf.edu/211_fall2002.web.dir/Randolph_Bailey/Web%20Project/index.htm>.

International Search Report dated Jan. 27, 2015 as received in Application No. PCT/IB2014/064679.

Written Opinion of the International Searching Authority dated Jan. 27, 2015 as received in Application No. PCT/IB2014/064679.

* cited by examiner

MEASURING LAUNCH AND MOTION PARAMETERS

CROSS-REFERENCE TO RELATED APPLICATION

This patent application claims the benefit of U.S. Provisional Patent Application No. 61/564,585, filed Nov. 29, 2011, which is incorporated herein by reference.

BACKGROUND

There have been apparatuses and methods for measuring motion parameters of golf balls after hitting, namely, velocity, angle of elevation, spin rate and azimuth. Included among the known devices that are used to improve the golf swing are a number of such devices which employ light sources, high speed camera, and radar technology. For example, launch monitors using radar technology provide a full suite of swing parameters of a club head and flight parameters of a golf ball. However, such launch monitors are expensive equipment and the price is not reasonable for ordinary players and beginners. Those monitors relatively low in price monitor mainly the velocity of the ball.

What is desired is a system and method for making comprehensive measurements of a golf ball's launching parameters with low manufacturing costs.

SUMMARY

The technologies described herein generally relate to systems and methods for monitoring launch and motion parameters of, for example, a golf ball.

The present invention relates to the development of a system monitoring instantaneous parameters of a flying object, for example, of a golf ball. These parameters include velocity, elevation angle and azimuth (degrees of left/right deviation on the horizontal plane). In order to measure the instantaneous parameters of a flying object, the following methods are employed. The system includes a transmitter optical subassembly (TOSA), and a receiver optical subassembly for transmitting the laser rays to the flying object and receiving the rays reflected back from the object and a camera sub system. The received signal reflected back from the object is used in conjunction with the camera sub system for parameter measurement.

Single or multiple pairs of laser sources may be controlled by the TOSA and laser sheets may be transmitted sequentially along an expected flight path of the object. Then the receiving subassembly with one or more photo detector modules, each module includes lens system (an optical device used to converge or diverge the received light), infrared filter and photo detector, received the reflected light form the flying object.

From the received signals, the time intervals of the flying object passing through the respective laser sheets are measured and the timing and signal shape information is used to deduce the speed, approximate azimuth angle of the flying round object, including but not limited to golf, baseball or cricket ball.

The system can be extended such that additional laser pairs could be added with a tilted a certain angle from another laser pair and forming an angle between the two laser sheets. That arrangement makes the time interval differences when the object passes through the laser sheets with the certain angle, i.e. launch angle or azimuth angle. This information could be used to position photo taking of the cameras with high precision.

A reference laser is used for the ball positioning of the lefty and the righty. A user can turn on the laser during the setup. The laser will also be on for a few seconds automatically after each shot for the reference of the next swing. Alternatively, the laser could be always on and be an indicator of the position of the ball and readiness of the device to capture flying object data. In addition, user can turn both lefty and righty reference lasers to position and align the unit for the target setting since the unit only can measure azimuth angle with respect to its own coordinate system.

For preventing strong interference from the sun, a direct current (DC) shunt monitor is used to measure the DC current caused by the sun. One light-emitting diode (LED) may be used to display the color for the user's involvement to reposition the box if the interference is more than the threshold level.

Three-dimensional accelerometer is installed in the system for the location based orientation problems at the system such as tilt in vertical position to avoid unit making wrong measurements.

Immediate voice feedback to the user is also provided by the system. So the system will make a voice for the speed and other relevant parameters of the ball through the wearable gadgets, i.e. earpiece, mobile phone, etc., with the user. The information includes but not limited to speed, launch angle, distance, azimuth angle, club speed etc.

The speed of the club can be estimated from the time difference between the ball and a club passing through the laser sheet.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Some embodiments described herein generally relate to apparatus, systems and methods for measuring launch parameters of a flying object, which may be substantially round object, such as a golf ball, a baseball or a cricket ball. Such parameters relate to motion of the object and may include, for example, speed, velocity, vertical angle of elevation and azimuth angle. As used herein, the term "azimuth angle," may refer to angular separation from a point of interest to a reference point and may include a degree of deviation to the left or right on a horizontal plane.

The system may include a transmitter optical subassembly (TOSA), and a receiver optical subassembly (ROSA) for transmitting rays from a laser to the flying object and receiving the rays reflected back from the object and a camera subsystem. As a non-limiting example, the TOSA may include single or multiple pairs of laser sources, each configured to transmit laser sheets sequentially along an expected flight path of the object. As used herein, the term "sheet" refers to a broad, relatively thin continuous surface or layer. The term "sequentially" as used herein may refer to a sequence of pulses of a beam of the laser, the pulses being separated in time.

The ROSA may include one or more photodetector modules, each module including a lens system (e.g., an optical device used to converge or diverge received light), an infrared filter and a photodetector. The ROSA may be configured to receive the rays of light reflected from the object. The reflected signal from the object is received at the ROSA and the time instances of the object passing through the laser sheets are extracted and used to determine exact timing of the photo taking event. The developed mathematical model computes the object's primary motion data, such as velocity, using the extracted timing information. Then these measured parameters are used to calculate critical photo taking time to enable measurement of launch parameters with reduced cost and improved efficiency. The mathematical model includes a non-linear filter for noise suppression, an integrator, a signal classifier and a speed estimator.

The signals from the rays reflected back from the object received by the ROSA may be used to calculate primary launch parameters of the object. For example, data related to the launch parameters may be determined using timing information extracted from a reflected signal of the flying object. The time intervals of the object passing through the respective laser sheets may be measured and timing and signal shape information may be used to deduce the speed, approximate azimuth angle of the object. The timing information may further be used to take pictures of the object and the pictures may be analyzed to determine the launch parameters. The measuring apparatus, system and method according to the present invention will be described in detail with reference to the accompanying drawings.

Figure 1:
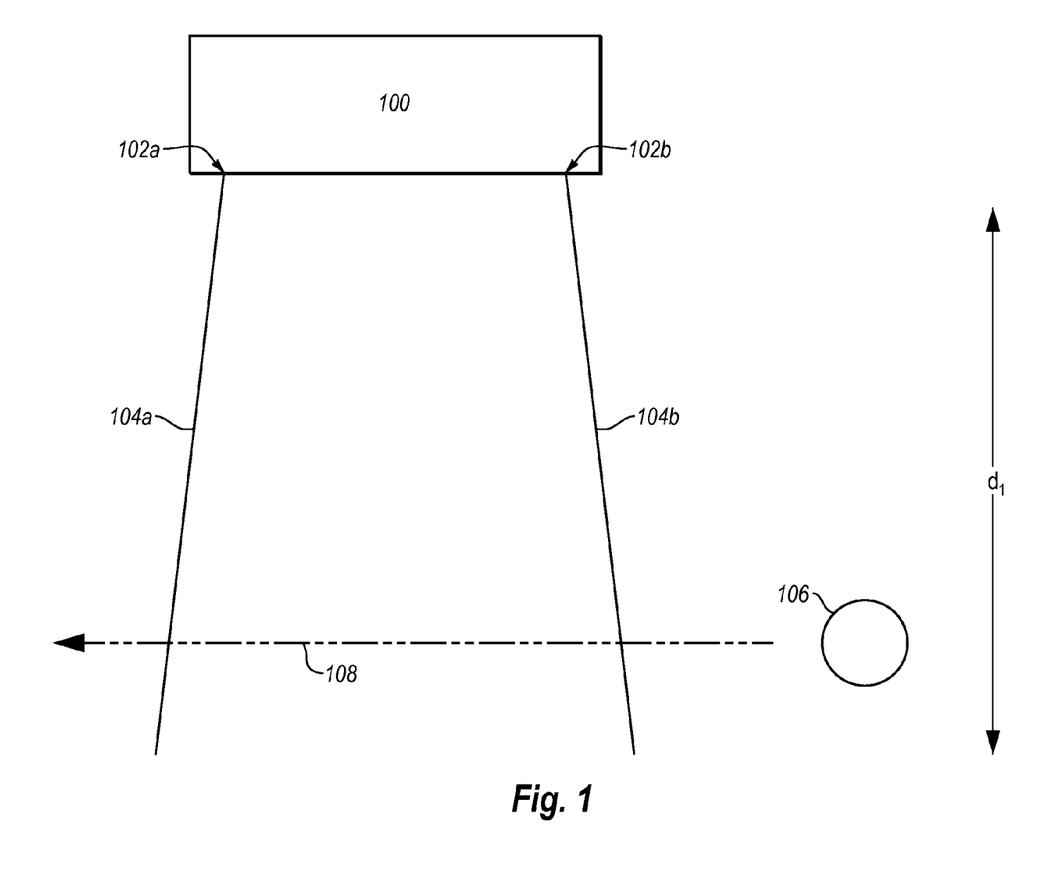
FIG. 1 is a diagram illustrating a top-down view of an apparatus for measuring launch parameters of a flying object.

FIG. 1 is a diagram illustrating a top-down view of an embodiment of an apparatus 100 for measuring launch parameters of a flying object 106. While the specific examples described refer to the object 106 as a ball or golf ball, the system and methods may be used to determine launch parameters of any flying object. The apparatus shown in FIG. 1 includes two pairs of laser sources 102a and 102b each configured to transmit or project a sheet of laser light or laser sheet 104a and 104b sequentially along the expected flight path 108 of the object 106. For simplicity, the apparatus 100 is illustrated as including two laser sources 102a and 102b. It is to be understood that the apparatus 100 may include any number of laser pairs. Furthermore, the additional laser pairs may be added and tilted at a certain angle from the other laser pairs forming an angle between the laser sheets provided by each of the laser pairs. Such a tiled arrangement provides time interval differences when the object passes through the laser sheets 104a and 104b with the certain angle, i.e., launch angle or azimuth angle. This information could be used to position cameras with high precision, as will be described. The laser system allows device to calculate speed, launch angle of the ball with reasonable accuracy. The speed and angle data can be used to calculate relative position of the object in the field of view of camera or cameras such that cameras can be tuned to take a picture of only relevant area. The images of the ball later can be processed to calculate exact speed, launch angle and other launch parameters of the object.

Each of the laser sheets 104a and 104b may be a substantially uniform sheet of laser light and may have a two-dimensional fan shape. One individual laser or laser is shining the laser sheets straight. As a non-limiting example, the laser sheet 104a and 104b may be formed using a laser diode, or other laser source, that emits the laser which is passed through an aspherical lens to create the two-dimensional fan-shaped laser sheet. For example, an infrared laser emitting diode may be arranged into a module together with a collimated lens and a Fresnel lens configured to form the collimated light into a sheet having a thickness of between about 1 mm and about 2 mm. The laser sources 102a and 102b are horizontally arranged at certain intervals, for example, between about 60 mm apart and about 80 mm apart.

The distance $d_1$ between the flight path 108 of the object 106 and each of the laser sheets 104a and 104b may be determined. The laser sources 102a and 102b of the apparatus 100 may be used to measure a velocity of the object 106 each laser can estimate the speed of the object 106 based on a reflection profile. One of the laser sources 102a and 102b may be used to measure launch parameters for right handed players, and the other may be used to measure launch parameters for the left handed players. Both lasers could also be used in tandem to further specify the photo taking event.

Figure 2:
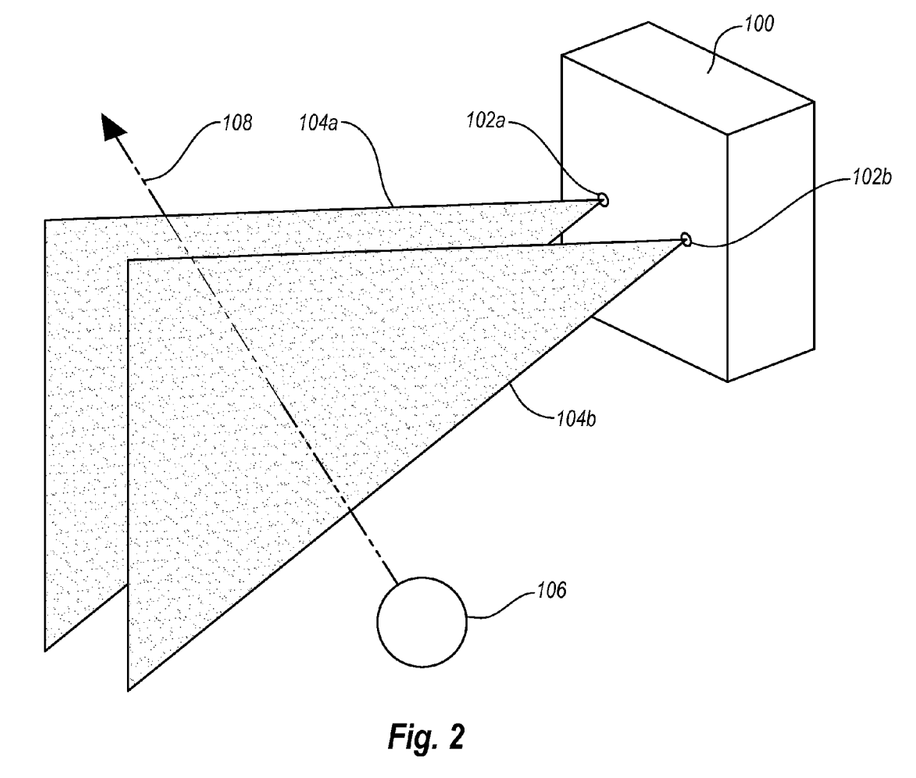
FIG. 2 is a diagram illustrating a perspective view of the apparatus of FIG. 1 including lasers sheets catching the object along a flight path of the object.

Referring to FIG. 2, the laser sheets 104a and 104b are emitted along the path of the object 106. When the object 106 passes through the laser sheets 104a and/or 104b reflected light from the object 106 are received at photodetector modules. A single photodetector module may include one or more convex lenses, an infrared filter, and photodetector for infrared light. The vision of the receiver is designed to capture the reflected light from the object in a designated area. The number of photodetector modules may be determined based on a view angle of the photodetector and the designated area to capture the reflected light.

Figure 3:
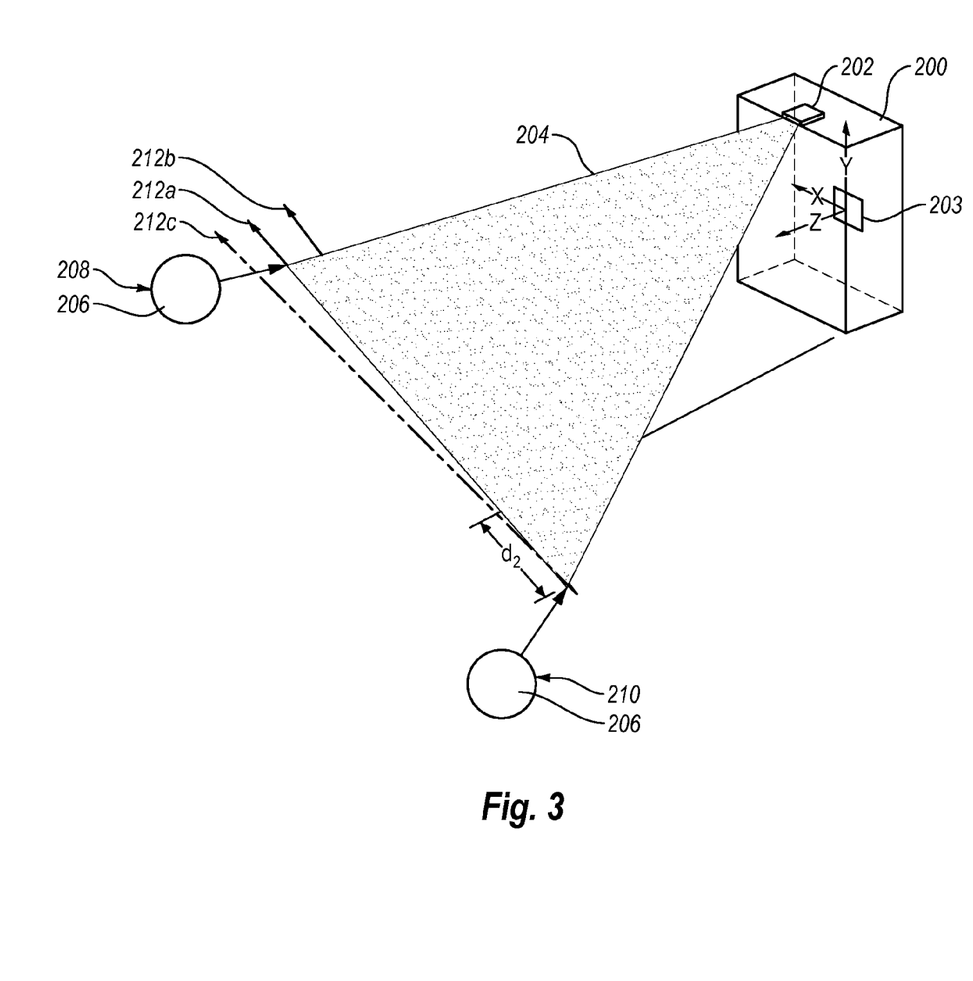
FIG. 3 shows a reference laser to indicate positioning and relative azimuth setting of the box such that user can contemplate the azimuth angle.

FIG. 3 shows an embodiment of an apparatus 200 for measuring launch parameters that includes a reference laser 202 for determining a location and direction of the object. The apparatus 200 also includes an accelerometer 203 for correcting the launch parameters of the object. The reference laser 202 may be configured to generate a laser sheet 204 having a two-dimensional fan-shaped beam. Alternatively, the reference laser 202 can be configured to provide two laser points instead of a line on the axis of 212a. The apparatus 200 supports the setting for a left-handed individual ("lefty") and a right-handed individual ("righty"). The left-handed ball position 208 and the right-handed position 210 are shown in FIG. 3. In embodiments in which the object is a golf ball, the distance d2 between the reference laser 202 pointing to the ball positions 208 or 210 and the first laser sheet 204 of the reference laser 202 is designed to have a distance gap between the golf ball and a club head when the golf ball passes through the laser sheet 204. For example, the object 206 may be located at a corner of a triangle formed by the laser sheet 204 so that the received signals may be differentiated as a signal originating from the object 206 or from a head of a golf club. The placement ensures a reasonable gap between club head and ball such that the laser sheet can correctly estimate the speed of the ball.

Additionally or alternatively, two point lasers (not shown) can be used instead of the reference laser 202 to indicate a placement point of the object 206. A user can turn on the reference laser 202 during setup. The reference laser 202 will also turn on for a few seconds automatically after each shot for the next swing. Alternatively, the reference laser 202 may always be on as long as the apparatus 200 is ready to make a measurement and only turned off if the apparatus 200 is unable to make a measurement due to a reason. The user may be prompted to place the object 206 such that he can no longer see the laser point to ensure proper placement of the ball. In this scenario, due to his eye sight blocked by the ball, he cannot observe the point location of the laser on the surface, which inherently ensures the placement of the ball. The flight path of the object 206 is shown by directional arrows 212a, 212b and 212c in FIG. 3. For the purposes of illustration, an example of an in-to-out golf ball path 212b and an example of an out-to-in golf ball path 212c are shown in FIG. 3.

Figure 4:
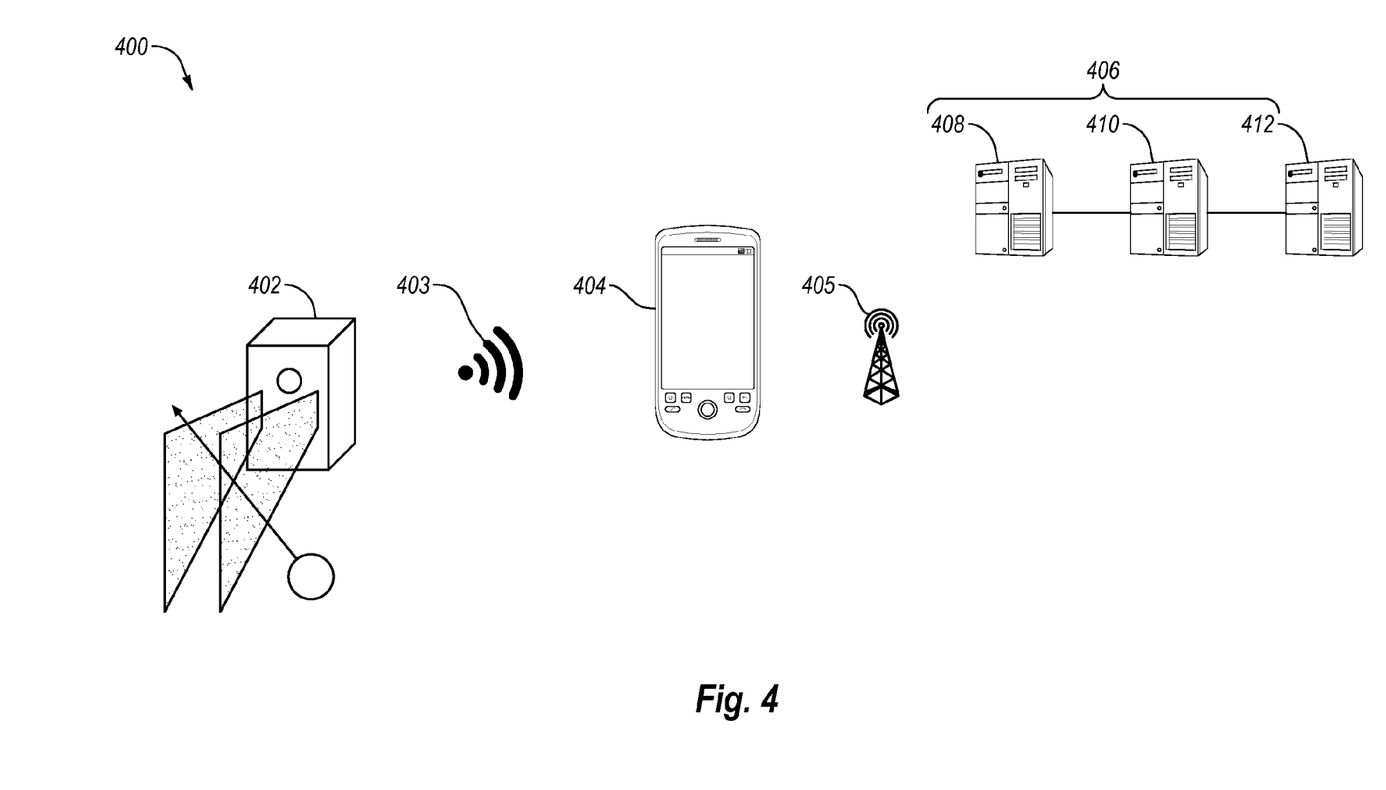
FIG. 4 illustrates an embodiment of a system including the apparatus for measuring launch parameters, a wearable system and a backend server.

As shown in FIG. 4, a system 400 for monitoring the launch parameters of a ball may include an apparatus 400 for measuring the launch parameters of the ball, such as the apparatus 100 and 200 shown in FIGS. 1, 2 and 3, a wearable or mobile device 404 and a backend server 406. The apparatus 402, the mobile device 404 and the backend server 406 may communicate with one another over at least one network 403 and 405. The term "network" may refer to one or more communication paths between devices including, but not limited to, any telecommunications network, data network, or Voice Over IP (VOIP) network, satellite, radio, microwave, millimeter-wave, RF wireless, RF cable, optical, and networking protocols (such as IEEE 802.11g), transmission media, and communications connections any combinations thereof. For example, the network may be a wireless network.

The user may position the apparatus 402 and turns the apparatus 402 on. The apparatus 402 executes a series of checks including the tilt of the apparatus 402 with respect to earth using accelerometers. Once apparatus 402 determines that the placement is level and that a network connection is available, the apparatus 402 may signal the user by turning on the reference laser of the apparatus 402 and indicates a measurement may be made. In this mode, most of the components of the apparatus 402 (including the cameras) are put in standby and a valid trigger event is sought. Upon a valid trigger event, the cameras are turned on and multiple photos are taken and subsequently images of the moving object are acquired. During this time, the reference laser is turned off until the data is processed. The images are cropped to include the moving object and transferred to the mobile device 404 via the network 403. The mobile device 404 remotely processes the images and launch parameters are obtained. As a non-limiting example, the mobile device 404 may process the images locally or using 3G/4G internet connection on a remote server.

Based on the calculated parameters, club head speed, maximum height, landing angle, projectile trajectory and landing angle can also be estimated. After the parameter assessment stage, the measured data are transmitted to the backend server 406 via the network 405 and may be stored as the user's record. The backend server 406 may include a web application 408, a wireless communication foundation (WCF) service 410 and a database 412. The user may access the stored records, may reload the stored records or can perform statistical analysis to observe the user's improvement using the mobile device 406. The system 400 may also provide immediate voice feedback to the user is also implemented. The system 400 will generate a voice or other alert, for the speed of the ball as an example, through the wearable gadgets, i.e., earpiece, mobile phone, etc., with the user.

Figure 5:
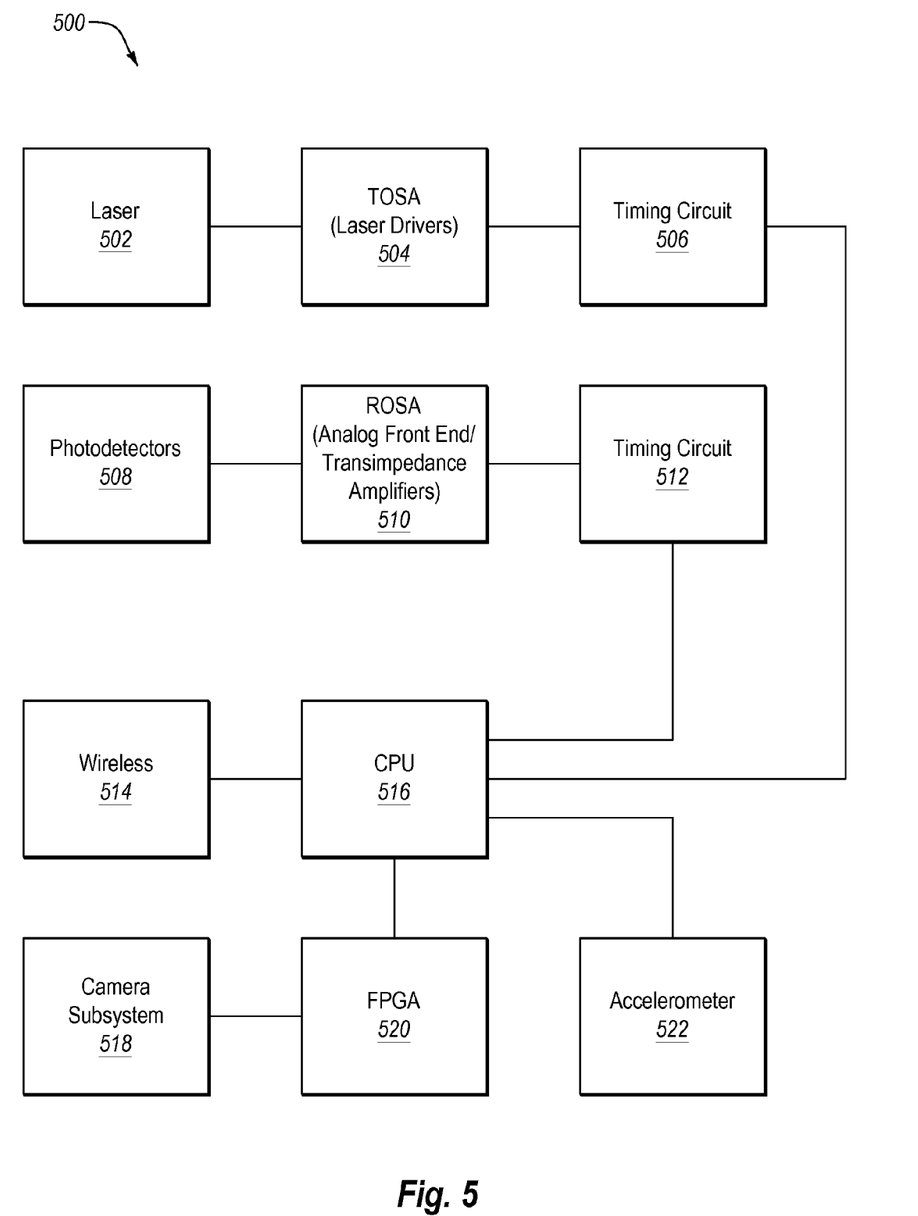
FIG. 5 is a simplified block diagram illustrating an embodiment of the architecture of the apparatus.
Figure 7:
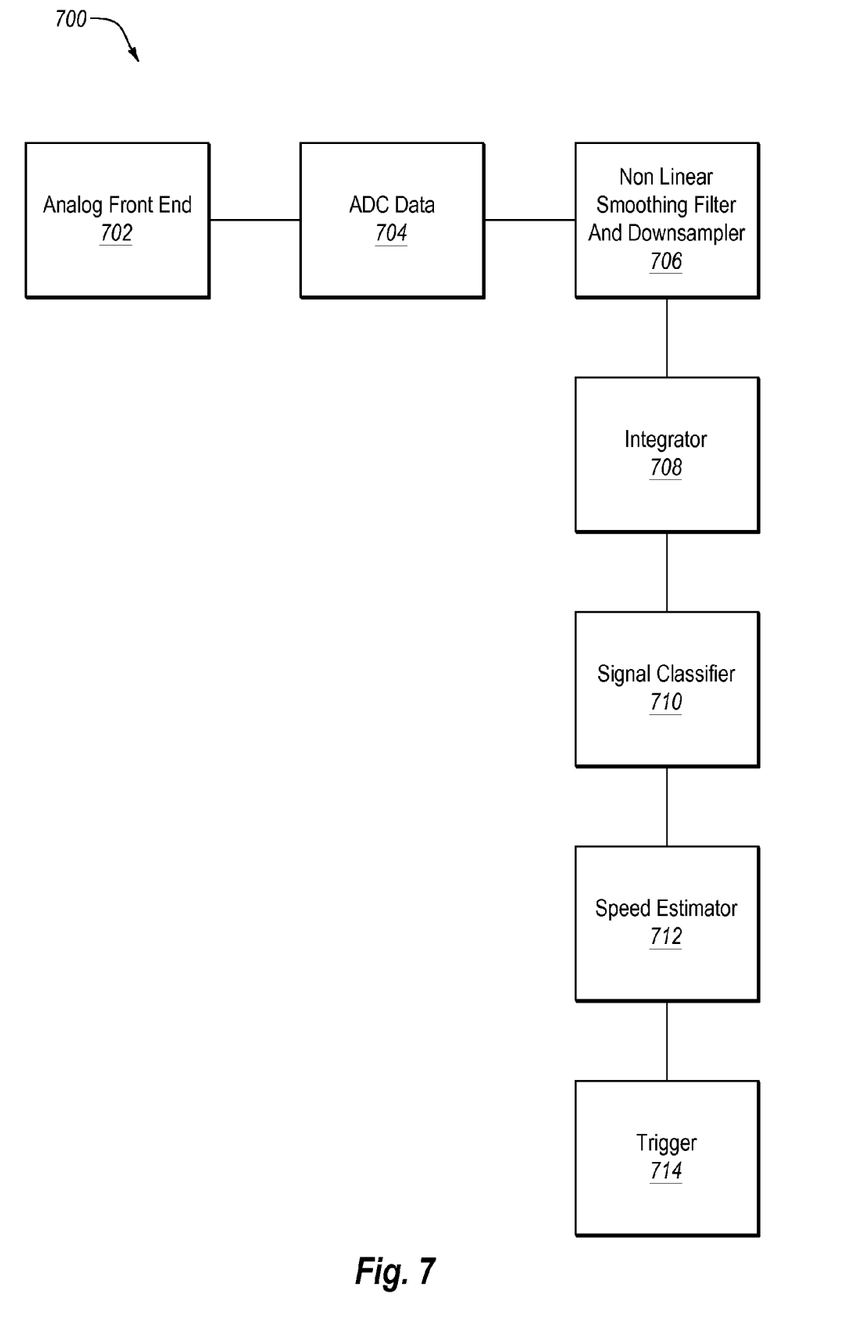
FIG. 7 is a block diagram illustrating a method of measuring at least one launch parameter.

FIG. 5 is a simplified block diagram illustrating the architecture of an apparatus for measuring launch parameters. The apparatus 500 may include lasers 502, a TOSA 504, a timing circuit 506, one or more photodetectors 508, a ROSA 510, an analog-to-digital converter (ADC) 512, a wireless transmitter/receiver 514, a central processing unit (CPU) 516, a camera subsystem 518, a field-programmable gate array (FPGA) 520 and an accelerometer 522. The FPGA 520 includes programmable logic that can be configured to control the camera subsystem 518. A flying object first hits the laser sheet or sheets provided by the TOSA 504. This event is captured by the one or more photodetectors 508 and ROSA 510. Reflected data passes through the timing circuit 506 and is sampled by the internal ADC 512 of the CPU 516 in real time. The CPU 516 processes the data as shown in FIG. 7. Once the CPU 516 detects that the object is a valid object such as golf ball, it instructs the FPGA 520 to start taking photos of the object, the appropriate timing and appropriate location of the object. The FPGA 520 uses this data to take multiple pictures of the object and stores the data in a local memory. Once the photo taking event is completed the FPGA 520 or CPU 516 crops the photographs to a smaller size, once this operation is completed, the photos are transmitted by the CPU 516 to using wireless subsystem 514, to the mobile device or other processing device.

Figure 6A:
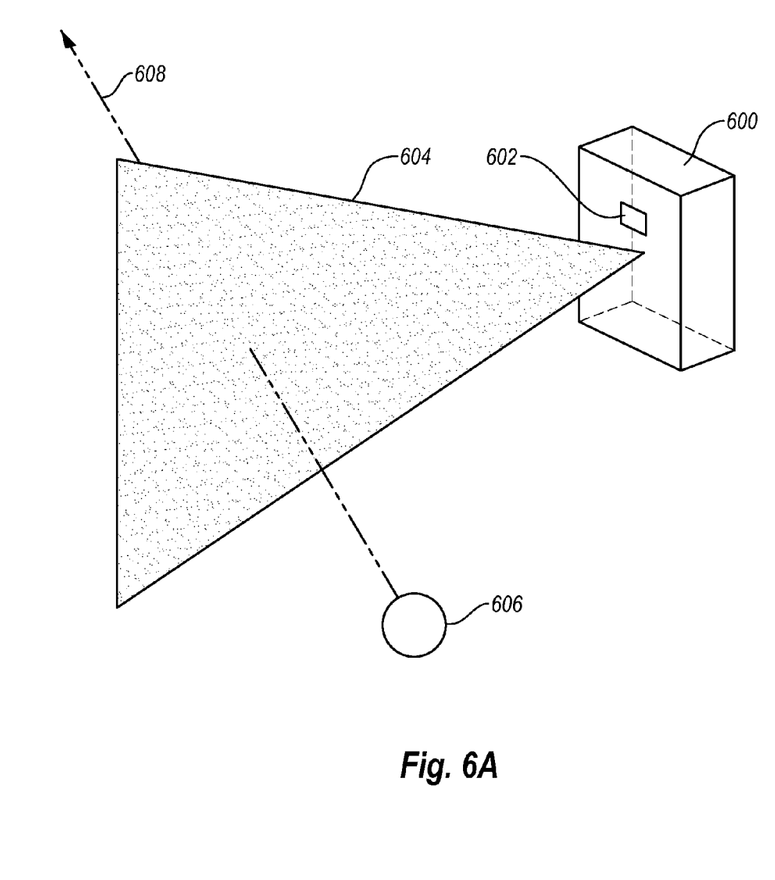
FIGS. 6A through 6C illustrate an embodiment of an apparatus including a single laser sheet and single photodetector system for the golf ball's speed measurement.
Figure 6B:
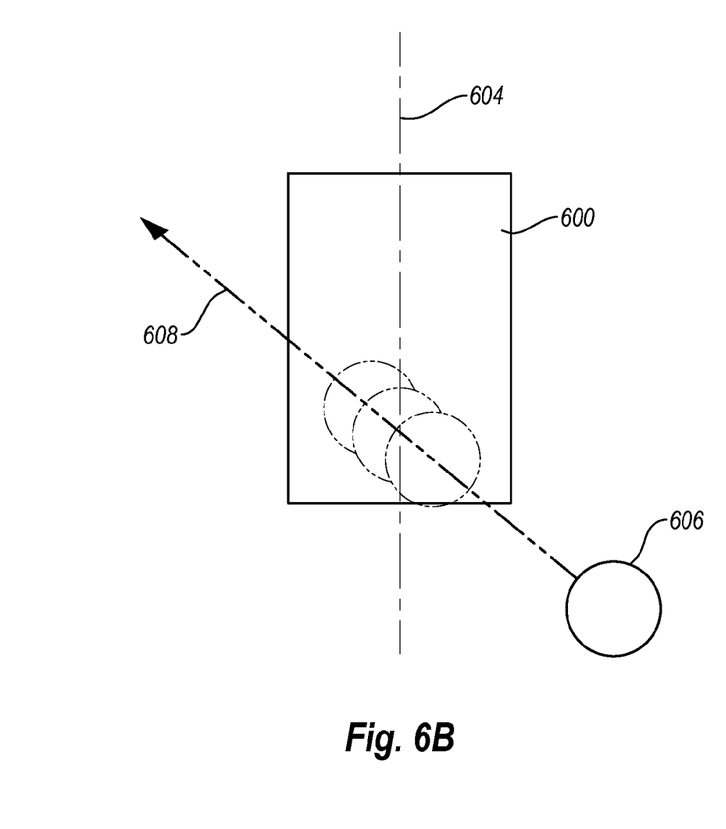
Figure 6C:
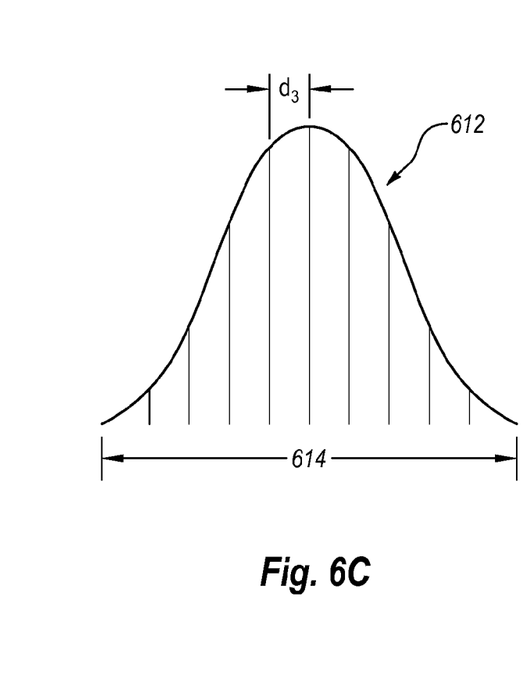

FIGS. 6A and 6B illustrate another embodiment of an apparatus for measuring launch parameters of an object. FIG. 6A is a perspective view of the apparatus 600, which generates a single laser sheet 604 and includes a single photodetector 602 for measurement of the object's speed. The object 606 may pass through the laser sheet 604 along a path 608. As shown in FIG. 6B, which is a front view of the apparatus 600, the object 606 may move along the path 608 through the laser sheet 604. The laser sheet 604 may be emitted sequentially in a series of pulses separated by time, or pulse width $d_3$. As show in 602, the reflected signal will have an amplitude change as the object travel through the laser sheet 604.

FIG. 7 is a block diagram illustrating a method of measuring at least one launch parameter. An incoming signal may be captured by the analog front end 702. The signal is passed through filtering stages to reduce noise. The cleaned signal is fed to a noise immune peak state detector, such as a non-linear smoothing filter and downsampler 706. Once the peak state detector determines that the signal contains a valid peak, the signal is passed through a signal classifier 710 where a shape of the signal is analyzed. Based on experimentation, the round object presents a symmetrical signal shape with a clean peak. Once the signal classifier 710 determines the signal matches the ball shape, slopes of the rise and fall are normalized and later analyzed using linear regression or similar methods. The normalized slope rise and fall contains speed information of the ball regardless of the amplitude of the signal. The speed estimator 712 may be configured to correlate the slopes to a speed. For example, the slopes may be matched to a look up table to determine the speed. This method enables detection of the speed of an incoming round object, such as a ball, with good precision regardless of the markings on the ball, cleanliness (e.g., whiteness) of the ball and relative distance of the ball to the detector which impacts the amplitude of the signal to a great degree.

Figure 8:
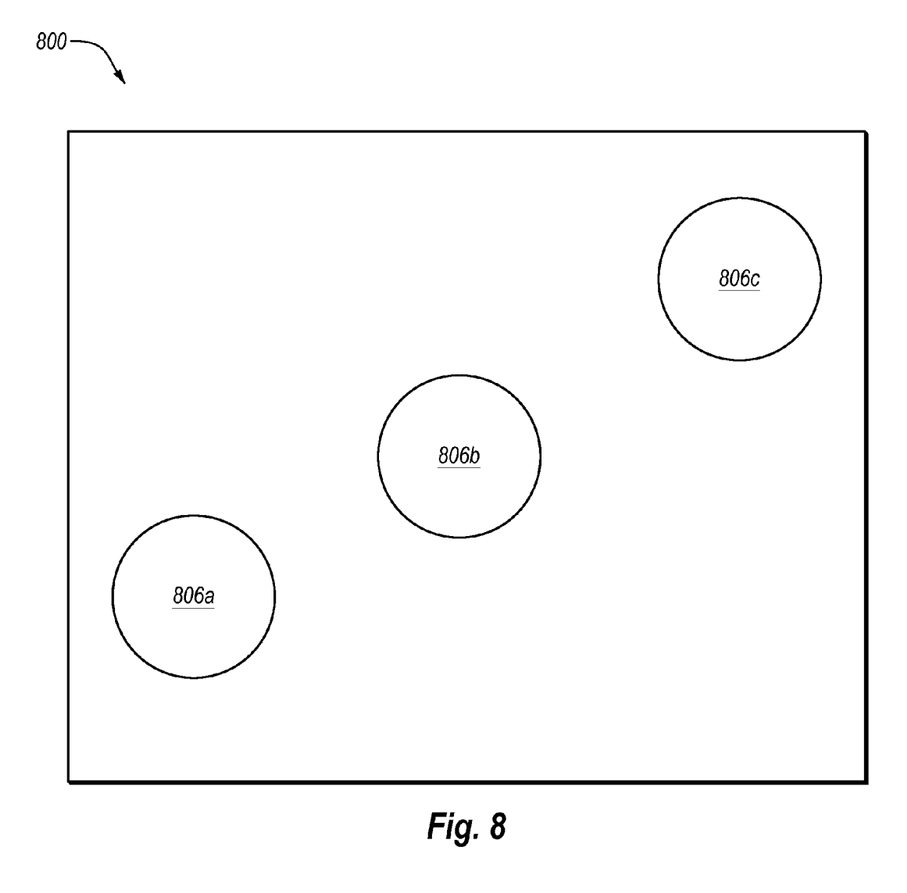
FIG. 8 is a diagram illustrating an embodiment of spatial distribution of the object in a uniform manner in a field of view of a camera.

The speed information gained in the speed estimation step 712 is used to time a photo taking event. Thus, the speed information may be a trigger 714 for the photo taking event. Advance knowledge of the ball speed provides several advantages. Using the advance knowledge of the speed information, the photo taking event can be timed such that images of the ball 806A, 806B and 806C are spatially distributed in a uniform manner in the field of view (FOV) 800 of camera, as shown in FIG. 8. This also allows more effective use of windowing feature of cameras. Usually cameras can be adjusted to take a picture only a limited area of their FOV which is usually referred as windowing. Advance knowledge of speed provides an opportunity to use lower cost cameras where they cannot have high frame rates but still can be used for this type of fast events due to the use of windowing capability more effectively.

The speed of the club head can be estimated using the principal of conservation of the momentum or the energy, as described in Bailey, Randolph. "Physics of the Drive in Golf." 211 Web Projects Fall 2002. Nov. 25, 2002. University of Alaska Fairbanks Nov. 21, 2011, which is incorporated herein in its entirety by this reference.

The whole system architecture consists of the detection system, wearable computing system and the backend server (FIG. 4). Transmitter optical subassembly (TOSA), receiver optical subassembly (ROSA), camera subsystem and primary processing unit are subcomponents of the detection system (FIG. 5).

In conclusion, the present system is developed for the assessment of parameters of a flying object, for example a golf or a baseball ball. The system measured the monition data such as velocity, the vertical angle of elevation and azimuth (degrees of left/right deviation on the horizontal plane) using the extracted timing information from the reflected signal of the flying object, later this information is used to take pictures of the object and pictures are analyzed and objects launch parameters are determined. This is the first ever system which can measure comprehensive motion parameters with low development cost due to advance knowledge of the speed information provided by the invention.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. An apparatus for monitoring launch parameters, comprising:
   a transmitter optical subassembly including at least one laser source configured to transmit a sheet of light such that a flying object passes through the sheet of light along an expected flight path of the flying object;
   a receiver optical subassembly including a photodetector configured to receive light transmitted by the transmitter and reflected back from the flying object as the flying object passes through the sheet of light, wherein at least one preliminary launch parameter of the flying object is determined based on the light reflected back from the flying object; and
   a camera subsystem comprising a camera having a field of view, the camera subsystem configured to take a plurality of pictures of the flying object in response to a triggering event that is based on the at least one preliminary launch parameter, and the plurality of pictures of the flying object are taken in a relevant area within the field of view that is determined based on the at least one preliminary launch parameter.

2. The apparatus of claim 1, further comprising a field-programmable gate array operably coupled to the camera subsystem and a central processing unit, the field-programmable gate array configured to receive input, based on the light reflected back from the flying object, from the central processing unit and to provide a trigger based on the light reflected back from the flying object.

3. The apparatus of claim 1, wherein the transmitter optical subassembly includes at least a second laser source configured to transmit a sheet of light such that the flying object passes through the sheet of light along the expected flight path of the flying object.

4. The apparatus of claim 3, further comprising a timing circuit operably coupled to the transmitter optical subassembly and configured to signal the transmitter optical subassembly to generate a single or multiple sheets of light in sequence with respect to the one laser source and the second laser source.

5. The apparatus of claim 1, wherein the launch parameters include at least one of velocity, vertical angle of elevation, azimuth angle, club head speed, maximum height, landing angle, projectile trajectory, and landing angle speed.

6. The apparatus of claim 1, wherein the receiver optical subassembly is configured to receive the reflected light from a golf ball.

7. The apparatus of claim 1, wherein an intensity time plot of when the flying object passes through the sheet of light is extracted and used to determine the particular time period that the camera is to take the plurality of pictures of the flying object in the relevant area.

8. The apparatus of claim 1, wherein the relevant area comprises an area that is a subset of the field of view.

9. A system for monitoring launch parameters, comprising:
   an apparatus, including:
      a transmitter optical subassembly including at least one laser source configured to transmit a sheet of light such that a flying object passes through the sheet of light along an expected flight path of the flying object;
      a receiver optical subassembly configured to receive light transmitted by the transmitter and reflected back from the flying object as the flying object passes through the sheet of light, wherein at least one preliminary launch parameter of the flying object is determined based on the light reflected back from the flying object;
      at least one camera subassembly comprising a camera having a field of view, the camera subassembly configured to take a plurality of pictures of the flying object in response to a triggering event that is based on the at least one preliminary launch parameter, and the plurality of pictures of the lying object are taken in a relevant area within the field of view that is determined based on the at least one preliminary launch parameter;
   a mobile device configured to process the plurality of pictures captured by the at least one camera and calculate at least one non-preliminary launch parameter; and
   a backend server configured to receive and store the at least one exact launch parameter.

10. The system of claim 9, wherein the apparatus further includes at least one device configured to determine placement of the apparatus.

11. The system of claim 9, wherein the system is configured to generate an alert related to the speed of the flying object, the alert configured to be provided to the user by the mobile device.

12. The system of claim 9, wherein the backend server is configured to store the at least one parameter for a user.

13. The system of claim 12, wherein the mobile device provides an interface enabling the user to access the stored at least one parameter.

14. The apparatus of claim 9, wherein the relevant area comprises an area that is a subset of the field of view.

15. A method for monitoring launch parameters, comprising:
- transmitting at least two laser sheets sequentially such that a flying object passes through the at least two laser sheets along an expected flight path of the flying object, wherein the at least two laser sheets are not parallel;
- receiving light reflected from the flying object as the flying object passes though the at least two laser sheets, using a receiving subassembly comprising at least one photodetector module, wherein at least one preliminary launch parameter of the flying object is determined based on the light reflected back from the flying object;
- tuning a camera having a field of view, within at least one camera subassembly, the camera subassembly configured to take plurality of pictures of the flying object in response to a triggering event that is based on the at least one preliminary launch parameter, and the plurality of pictures of the lying object are taken in a relevant area within the field of view that is determined based on the at least one preliminary launch parameter;
- determining ratios of the time interval to estimate a velocity, an elevation angle and an azimuth of the flying object;
- analyzing a curve of an intensity time plot based on the light reflected by the flying object;
- determining if the curve of the intensity time plot corresponding to the light reflected from the flying object matches a shape of the flying object; and
- estimating a velocity of the flying object based on a correlation of the intensity time plot and a known shape and size of the flying object.

16. The method according to claim 15, wherein estimating a velocity of the flying object includes using mathematical regression methods.

17. The apparatus of claim 15, wherein the relevant area comprises an area that is a subset of the field of view.

* * * * *